(12) United States Patent
Ress

(10) Patent No.: US 11,415,175 B2
(45) Date of Patent: Aug. 16, 2022

(54) ROLLING-ELEMENT BEARING INCLUDING A COVER FOR RETAINING A LUBRICANT

(71) Applicant: AKTIEBOLAGET SKF, Gothenburg (SE)

(72) Inventor: Andre Ress, Oberelsbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/210,817

(22) Filed: Mar. 24, 2021

(65) Prior Publication Data

US 2021/0317879 A1 Oct. 14, 2021

(30) Foreign Application Priority Data

Apr. 8, 2020 (DE) .......................... 102020204525.9

(51) Int. Cl.
*F16C 33/78* (2006.01)
*F16C 33/58* (2006.01)

(52) U.S. Cl.
CPC ........ *F16C 33/7886* (2013.01); *F16C 33/586* (2013.01); *F16C 33/585* (2013.01)

(58) Field of Classification Search
CPC ....... D01H 7/042; F16C 19/06; F16C 19/166; F16C 33/585; F16C 33/586; F16C 33/7886
See application file for complete search history.

(56) References Cited

U.S. PATENT DOCUMENTS

| 3,010,771 | A | * | 11/1961 | Cogger | F16C 13/006 |
| | | | | | 277/369 |
| 3,455,615 | A | * | 7/1969 | Leo | F16C 33/723 |
| | | | | | 384/489 |
| 3,770,992 | A | * | 11/1973 | Veglia | F16C 43/045 |
| | | | | | 384/489 |
| 4,350,398 | A | | 9/1982 | Schulz et al. | |
| 6,062,734 | A | | 5/2000 | Bundgart | |
| 6,267,712 | B1 | * | 7/2001 | Franke | D01H 5/74 |
| | | | | | 492/16 |
| 2012/0201486 | A1 | | 8/2012 | Ito et al. | |
| 2017/0370418 | A1 | | 12/2017 | Edelmann et al. | |
| 2020/0217359 | A1 | | 7/2020 | Edelmann et al. | |

FOREIGN PATENT DOCUMENTS

| DE | 3612066 A | * | 10/1987 | ............... D01H 5/74 |
| DE | 9307931 U1 | * | 9/1993 | |
| DE | 10019636 A1 | * | 10/2001 | ............. D01H 13/02 |
| DE | 102010009467 A1 | * | 7/2011 | ............. B65H 51/10 |

OTHER PUBLICATIONS

DE9307931desc_machine_translation.*

* cited by examiner

*Primary Examiner* — Phillip A Johnson
(74) *Attorney, Agent, or Firm* — J-TEK Law PLLC; Scott T. Wakeman; Mark A. Ussai

(57) ABSTRACT

A rolling-element bearing includes an outer ring, an inner ring having a bore, a bearing interior between by the outer ring and the inner ring, a plurality of rolling elements in the bearing interior, and a cover attached to the rolling-element bearing such that it extends along an end face of the rolling-element bearing and covers the bearing interior, the inner ring, and the bore.

20 Claims, 4 Drawing Sheets

ROLLING-ELEMENT BEARING INCLUDING A COVER FOR RETAINING A LUBRICANT

CROSS-REFERENCE

This application claims priority to German patent application no. 10 2020 204 525.9 filed on Apr. 8, 2020, the contents of which are fully incorporated herein by reference.

TECHNOLOGICAL FIELD

The present disclosure is directed to a bearing including a cover for improving lubricant retention and toward a bearing assembly including the bearing.

BACKGROUND

In certain applications, such as, for example, in textile machine engineering, rolling-element bearings may be subjected to centrifugal forces. This can happen, for example, when the rolling-element bearings are mounted on devices that are themselves set into rotation. If the axis of rotation of the device is perpendicular to the axis of rotation of the rolling-element bearing mounted on the device, the centrifugal forces exerted on the rolling-element bearing can cause a lubricant needed for the frictionless operation of the bearing to pressed out in the axial direction of the rolling bearing due to the centrifugal forces exerted on the lubricant.

A number of conventional seal elements are known that are designed to seal a bearing interior of a rolling-element bearing. However, in particular when the rotational speeds of the device on which the rolling-element bearing is mounted are relatively high, lubricant can be pressed our of the rolling-element bearing despite the presence of known seal elements. This can lead to inadequate lubrication in the rolling-element bearing, as a result of which the service life of the bearing can be reduced.

SUMMARY

It is therefore an aspect of the present disclosure to provide a rolling-element bearing that has an improved service life even when the rolling-element bearing is subjected to centrifugal forces in the axial direction.

The disclosed rolling-element bearing comprises an outer ring and an inner ring disposed coaxially thereto which between them define a bearing interior. At least one row of rolling elements is disposed in the bearing interior. The inner ring further comprises a bore in which a shaft is receivable that is connectable to the inner ring for conjoint rotation therewith.

In order to improve the service life of the rolling-element bearing even when the rolling-element bearing is subjected to centrifugal forces in the axial direction, a cover extending end-side on the rolling-element bearing is attached to the outer ring, which cover covers the bearing interior, the inner ring, and the bore. Here the cover can be adapted to reduce or even to prevent a lubricant loss, in particular when the rolling-element bearing is subjected to centrifugal forces. By reducing if not actually preventing lubricant loss, insufficient lubrication in the rolling-element bearing can be delayed or prevented, and the service life of the rolling-element bearing can thereby be increased.

Balls, for example, can be provided as rolling elements. However, other types of rolling elements can be used, such as, for example, cylinders, tapered rollers, barrels, and the like. The rolling elements can be manufactured from metal, in particular rolling-element bearing steel, or ceramic. Alternatively rolling elements made of two different materials, such as, for example, rolling-element bearing steel and ceramic, can be used together in the rolling-element bearing. The rolling-element bearing can be, for example, a deep groove ball bearing. However, the rolling-element bearing can also be a different type of rolling-element bearing such as, for example, a cylindrical roller bearing, a tapered roller bearing, or the like.

Seal elements can additionally be provided independently of the cover that seal the bearing interior. Alternatively the shaft can also be formed integrally with the inner ring, or the rolling elements can slip against the shaft.

A gap is preferably formed between an end surface of the bearing inner ring and the cover so that the cover is spaced from end surface of the bearing inner ring or does not abut against the end surface of the bearing inner ring. This has the advantage in particular that friction between the cover and end surface of the bearing inner ring, which occurs when either the inner ring or the outer ring is set in rotation, can be prevented. For example, a recess can be provided in the cover. Additionally or alternatively the end surface of the bearing inner ring can also be recessed relative to the cover.

According to a further exemplary embodiment the cover can be releasably attached to the outer ring. This has the advantage that the cover remains accessible for maintenance work and/or relubrication.

In order to releasably attach the cover to the outer ring, one or more recesses are preferably formed on the outer ring, and one or more projections configured complementary to recesses are formed on the cover, wherein in the assembled state the projections engage in the recesses. Preferably an encircling groove is provided on the outer ring, and an encircling rib is provided on the cover.

Alternatively one or more recesses, preferably an encircling groove, can be formed on the cover, and one or more projections, preferably an encircling rib, configured complementary to the recesses can be formed on the outer ring, wherein in the assembled state the projections engage in the recesses in order to releasably attach the cover to the outer ring.

Using the one or more recesses or groove, and the projections or rib configured complementary to the recesses, the cover can be attached to the outer ring in a simple and reliable manner. The at least one recess is preferably disposed in a radially inner surface of the outer ring and extends essentially radially outward. In particular the groove can be a groove that is already provided for a seal element for sealing the bearing interior in the radially inner surface of the outer ring.

According to one preferred embodiment, one or more undercuts are formed on the recess, and one or more snap lugs configured complementary to the undercut are formed on the projection, wherein in the assembled state the undercuts and snap lugs engage so that the cover is attached to the outer ring in a self-retaining manner. This has the advantage that the cover can be easily and quickly snapped into the recess. In particular, if a groove is already provided in the outer ring, the rolling-element bearing can be retroactively equipped with a cover.

The cover is preferably manufactured, injection molded, for example, from a plastic material. The plastic material is advantageously chosen such that it has a certain elastic deformability that allows the cover to snap onto the outer ring, in particular into the groove.

A further aspect of the disclosure comprises a textile machine including a device that is configured to rotate about an axis, wherein on the device at least one shaft is provided that is supported by at least one rolling-element bearing described above, wherein an axis of rotation of the at least one rolling-element bearing is perpendicular to the axis of rotation of the device. Here in particular the rotational speed of the device can be 10 to 20 times higher than the rotational speed of the rolling-element bearing.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the appended claims.

DETAILED DESCRIPTION

In the following, identical or functionally equivalent elements are designated by the same reference numbers.

Figure 1:
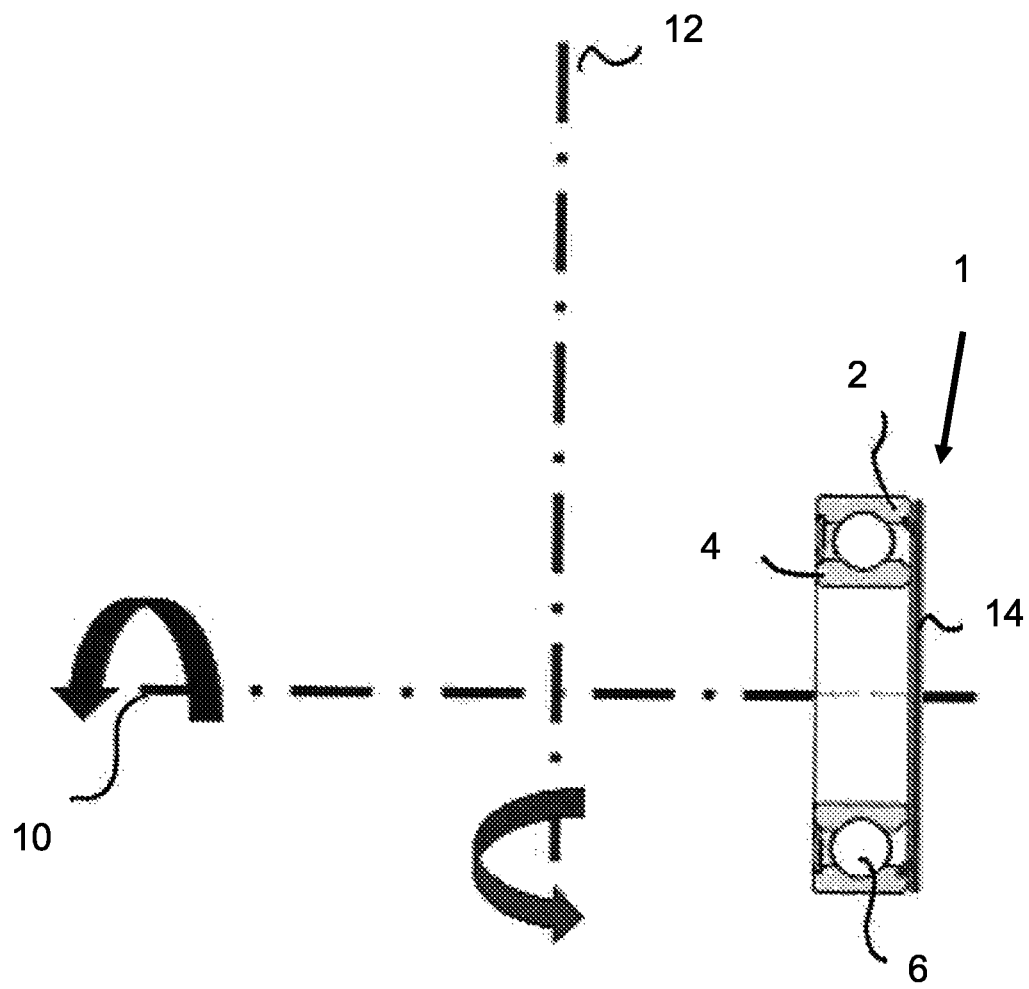
FIG. 1 is a schematic view of a rolling-element bearing according to an exemplary embodiment of the present disclosure.

FIG. 1 shows a schematic view of a rolling-element bearing 1 according to one exemplary embodiment in an assembly in which the rolling-element bearing 1 is subjected to centrifugal forces in the axial direction. For example, the rolling-element bearing 1 can be configured to rotate about an axis of rotation 10, while it is simultaneously mounted on a device (not shown) that itself rotates about an axis of rotation 12, perpendicular to the axis of rotation 10, so that the rolling-element bearing 1 is also acted upon by centrifugal forces in the axial direction (axial relative to the rolling-element bearing 1).

The rolling-element bearing 1 comprises an outer ring 2 and a coaxial inner ring 4. Between the outer ring 2 and the inner ring 4 a bearing interior is defined in which at least one row of rolling elements 6, in this case balls, are disposed. The inner ring 4 further includes a bore 8 (FIG. 2) in which a shaft (not shown), connectable to the inner ring 4 such that they rotate together, is receivable that rotates about an axis of rotation 10. Alternatively the inner ring 4 can also be formed integrally with the shaft.

In order to improve the service life of the rolling-element bearing 1 even when the rolling-element bearing 1, as indicated in FIG. 1, is subjected to centrifugal forces in the axial direction, a cover 14 extending from an end of the rolling-element bearing is attached to the outer ring 2, which cover covers the bearing interior, the inner ring 4, and the bore 8. The cover 14 is advantageously adapted to reduce or even prevent a lubricant loss due to the exerted centrifugal forces.

Figure 2:
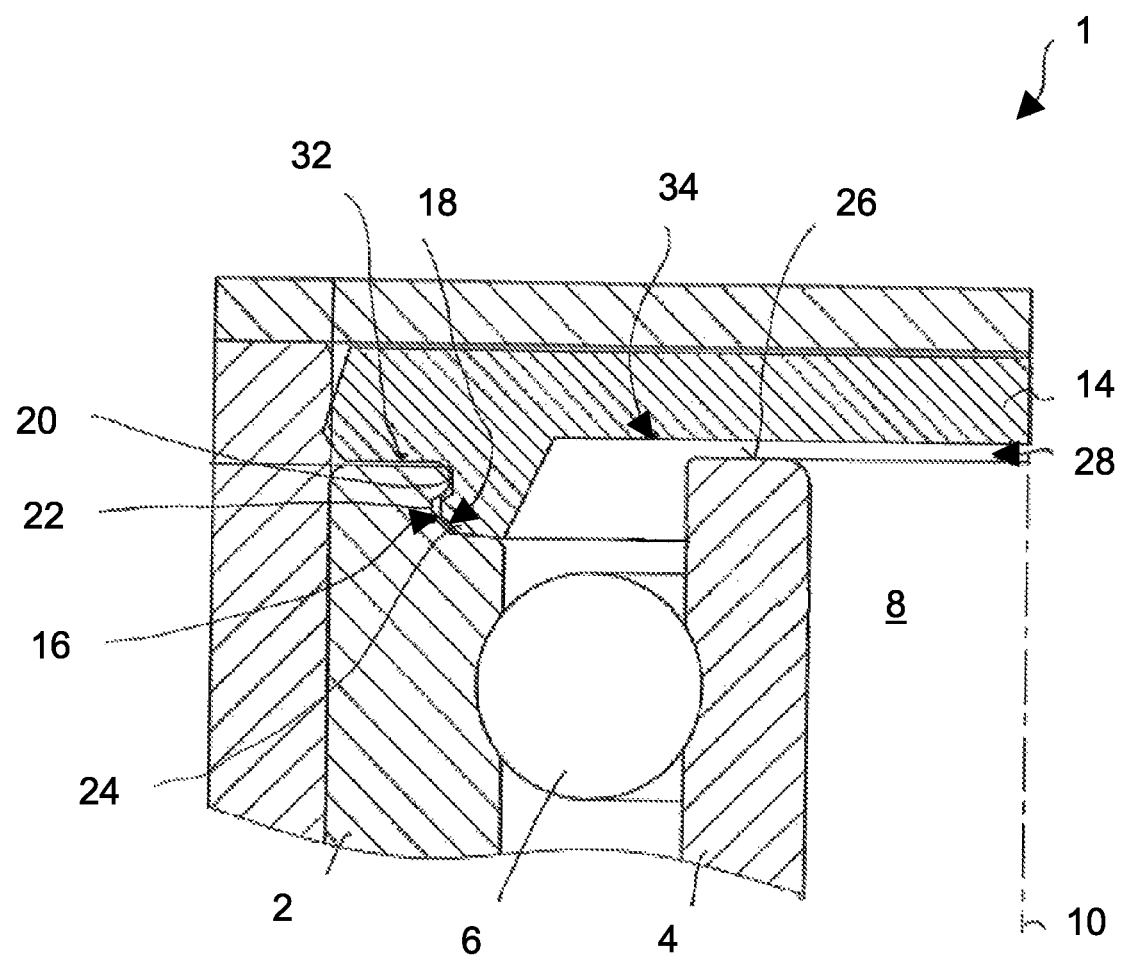
FIG. 2 is a partial sectional view through the rolling-element bearing of FIG. 1.

In the embodiment shown in FIG. 2, in order to releasably attach the cover 14 to the outer ring 2, a groove 16 is formed on the outer ring, and a rib 18 configured complementary to the groove 16 is provided on the cover 14, so that in the assembled state shown in FIG. 2 the rib 18 engages into the groove 16. Alternatively in the exemplary embodiment depicted the groove 16 can be formed by one or more recesses, and the rib 18 can be formed by one or more projections configured complementary to the recesses. According to another not-shown exemplary embodiment, the groove 16 can be provided on the inner ring 4, and the rib 18 can be provided on the outer ring 2.

In the exemplary embodiment shown in FIG. 2, the groove 16 is disposed in a radially inner surface 20 of the outer ring 2 at an axially outer edge and extends essentially radially outward. In particular, the groove 16 can be a groove that is already present in some bearing outer rings for attaching known seal elements. In addition, in the exemplary embodiment shown an undercut 22 is formed in the groove 16, into which a snap lug 24 that is formed complementary to the undercut 22 is snapped, so that the undercut 22 and the snap lug 24 enter into engagement in the assembled state. This makes it possible to attach the cover 14 to the outer ring 2 in a self-retaining manner.

Furthermore, a gap 28 is formed between an end surface 26 of the bearing inner ring 4 and the cover 14 so that the cover 14 is spaced from end surface 26 of the bearing inner ring 4. For this purpose, as can be seen in FIG. 2, a central inner surface 34 of the cover 14 can be recessed with respect to an abutment surface 32 of the cover 14 on the outer ring 2.

Figure 3:
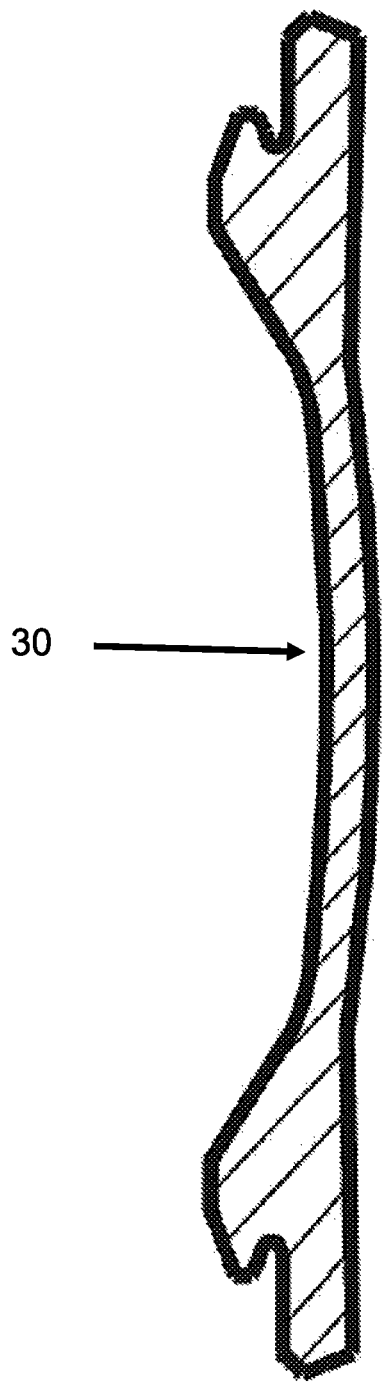
FIG. 3 is a schematic sectional view of a cover according to a further exemplary embodiment.

In one alternative exemplary embodiment of the end surface 14 that is shown in FIG. 3, a recess 30 is provided in the cover 14 in order to space the central inner surface 32 from the end surface 26 of the bearing inner ring 4. Additionally or alternatively the end surface 26 of the bearing inner ring can also be recessed with respect to the cover 14, or an axial extension of the inner ring 4 can be smaller than an axial extension of the outer ring 2.

The cover 14 can be manufactured from plastic by an injection-molding process. The plastic material is advantageously chosen such that it has a certain elastic deformability that makes it possible to allow the cover 14 to snap into the groove 16.

Figure 4:
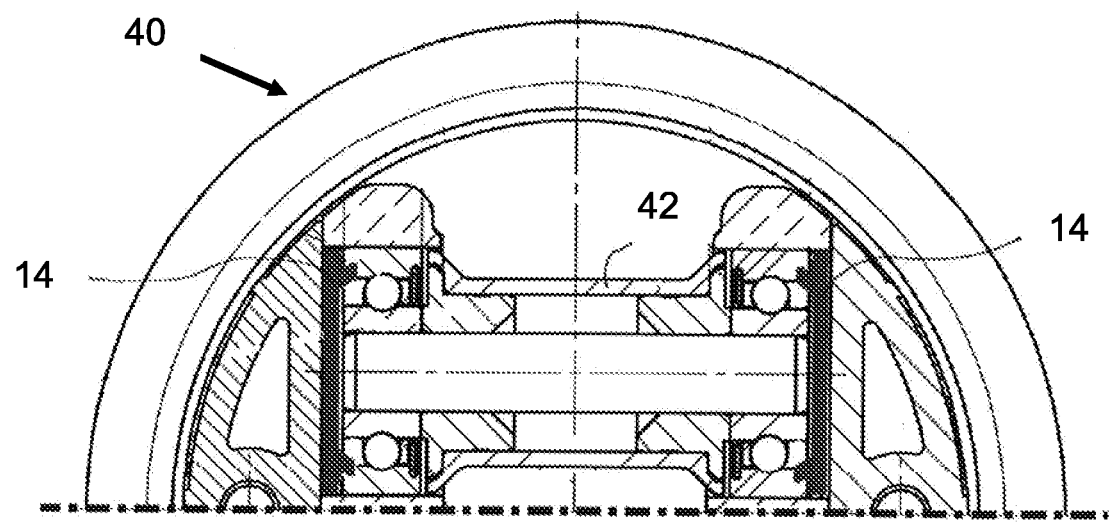
FIG. 4 is a schematic partial view of a textile machine according to a further exemplary embodiment.

FIG. 4 shows a partial view of a textile machine including a device 40 that is configured to rotate about an axis (not shown). The device 40 comprises a shaft 42 that is supported by two rolling-element bearings (not visible) described above, wherein the axes of rotation of the rolling-element bearings are coaxial. The axes of rotation of the rolling-element bearings are perpendicular to the axis of rotation of the device 40. In particular, the rotational speed of the device 40 can be 10 to 20 times higher than the rotational speed of the rolling-element bearings. The arrangement of the axes of rotation of the rolling-element bearings on the one hand and of the device on the other hand, in combination with the relatively high rotational speed of the device 40, cause centrifugal forces to act on the rolling-element bearings in the axial direction. As a result of the centrifugal forces acting on rolling-element bearings in the axial direction, without the providing of the cover 14 lubricant is pressed out of the rolling-element bearings.

In order to prevent this loss of lubricant when the rolling-element bearings 1 are subjected to centrifugal forces by the rotation of the device 40, the rolling-element bearings 1 are each provided with a cover 14. By substantially reducing, if not actually preventing a lubricant loss, an insufficient lubrication in the rolling-element bearing 1 can be delayed or prevented, whereby the service life of the rolling-element bearing can be increased.

Overall, due to the attaching on the outer ring of a cover 14 that extends from an end of the bearing and covers the bearing interior, the inner ring 4, and the bore 8, a lubricant loss due to centrifugal forces that affect the rolling-element bearing in the axial direction can be at least reduced if not prevented. In particular this can increase the service life of the rolling-element bearing. In addition, the cover is simple to manufacture and can be simply attached to the outer ring. Grooves already present on the outer ring can be used for this purpose so that already existing bearings can also be retrofitted and new bearings do not need to be additionally processed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing
2 Outer ring
4 Inner ring
6 Rolling element
8 Bore
10 Axis of rotation
12 Axis of rotation
14 Cover
16 Groove
18 Rib
20 Outside surface
22 Undercut
24 Snap lug
26 End surface
28 Gap
30 Recess
32 Abutment surface
34 Inner surface
40 Device
42 Shaft

What is claimed is:

1. A rolling-element bearing comprising:
an outer ring,
an inner ring having a bore,
a bearing interior between by the outer ring and the inner ring,
a plurality of rolling elements in the bearing interior, and
a cover attached to the rolling-element bearing such that it extends along an end face of the rolling-element bearing and covers the bearing interior, the inner ring, and the bore,
wherein the cover has an outer periphery and a projection extending axially into the outer ring, and
wherein the projection is located radially inward from the outer periphery of the cover.

2. The rolling-element bearing according to claim 1,
wherein the rolling-element bearing comprises a deep-groove ball bearing, and
wherein the cover is releasably attached to the outer ring.

3. The rolling-element bearing according to claim 2,
wherein the cover comprises a disk having an outer diameter greater than an inner diameter of the outer ring, and
wherein the cover is configured to substantially seal one side of the rolling-element bearing.

4. The rolling-element bearing according to claim 3,
wherein the cover is configured to substantially prevent a lubricant in the bearing interior or in the bore from moving axially past the cover when the lubricant is driven against the cover by a centrifugal force.

5. The rolling-element bearing according to claim 1, wherein the cover is spaced from the inner ring by an axial gap.

6. The rolling-element bearing according to claim 1,
wherein the outer ring includes a radially inwardly facing projection, and
wherein the cover includes a radially outwardly facing projection radially overlapping the inwardly facing projection of the outer ring.

7. The rolling-element bearing according to claim 1, wherein the cover comprises a body formed of injection-molded plastic.

8. A rolling-element bearing assembly of a textile machine including the rolling-element bearings of claim 1.

9. The rolling-element bearing according to claim 1,
wherein the cover has an outer diameter greater than an outer diameter of the outer ring before it is attached to the outer ring and is radially compressed by insertion into the outer ring such that the outer diameter of the cover is equal to the outer diameter of the outer ring after insertion into the outer ring.

10. The rolling-element bearing according to claim 9,
wherein the outer ring includes a radially inwardly facing groove, and
wherein a portion of the projection extends radially into the groove.

11. The rolling-element bearing according to claim 1, wherein the cover at least partially overlies an axially outer surface of the outer ring at a location radially outward of the projection.

12. The rolling-element bearing according to claim 1,
wherein the outer ring includes a radially inwardly facing groove, and
wherein a portion of the projection extends radially into the groove.

13. The rolling-element bearing according to claim 12, wherein the projection comprises an annular rib.

14. The rolling-element bearing according to claim 13, wherein the groove is disposed at an axially outer side of the radially inner surface of the outer ring.

15. The rolling-element bearing according to claim 13, wherein the groove includes at least one undercut,
wherein the rib includes at least one snap lug configured to engage the at least one undercut to secure the cover to the outer ring.

16. The rolling-element bearing according to claim 1, wherein no portion of the projection extends beyond the outer periphery of the cover.

17. A textile machine comprising:
a body configured to rotate about a first axis,
a shaft having a longitudinal axis of rotation, the shaft being supported by the body such that the longitudinal axis of rotation is perpendicular to the first axis, and
the rolling-element bearing according to claim 1.

18. A rolling-element bearing comprising:
an outer ring,
an inner ring having a bore,
a bearing interior between by the outer ring and the inner ring,
a plurality of rolling elements in the bearing interior, and
a cover attached to the rolling-element bearing such that it extends along an end face of the rolling-element bearing and covers the bearing interior, the inner ring, and the bore,
wherein the rolling-element bearing comprises a deep-groove ball bearing,
wherein the cover is releasably attached to the outer ring,
wherein the cover has an outer diameter greater than an outer diameter of the outer ring such that the cover is radially compressed when inserted into the outer ring, and
wherein the cover completely overlies an axially facing side of the outer ring and completely overlies an axially facing side of the inner ring and completely overlies an axial end of the bore.

19. A textile machine comprising:
a body configured to rotate about a first axis,
a shaft having a longitudinal axis of rotation, the shaft being supported by the body such that the longitudinal axis of rotation is perpendicular to the first axis, and
a rolling-element bearing mounted on the shaft,
wherein the rolling-element bearing includes,
an outer ring,
an inner ring having a bore,
a bearing interior between by the outer ring and the inner ring,
a plurality of rolling elements in the bearing interior, and
a cover attached to the rolling-element bearing such that it extends along an end face of the rolling-element bearing and covers the bearing interior, the inner ring, and the bore.

20. The textile machine according to claim 19, wherein the body is configured to rotate about the first axis at a rate 10 to 20 times greater than a rotational speed of the bearing.

* * * * *